(12) United States Patent
Hall, II et al.

(10) Patent No.: US 11,608,920 B2
(45) Date of Patent: Mar. 21, 2023

(54) CONNECTION VERIFIER

(71) Applicant: Oetiker NY, Inc., Lancaster, NY (US)

(72) Inventors: Thomas Edwin Hall, II, Buffalo, NY (US); Lawrence Butts, Shelby Township, MI (US)

(73) Assignee: Oetiker NY, Inc., Lancaster, NY (US)

( * ) Notice: Subject to any disclaimer, the term of this patent is extended or adjusted under 35 U.S.C. 154(b) by 337 days.

(21) Appl. No.: 16/766,332

(22) PCT Filed: Oct. 22, 2018

(86) PCT No.: PCT/US2018/056885
§ 371 (c)(1),
(2) Date: May 22, 2020

(87) PCT Pub. No.: WO2019/103802
PCT Pub. Date: May 31, 2019

(65) Prior Publication Data
US 2020/0370695 A1    Nov. 26, 2020

Related U.S. Application Data

(60) Provisional application No. 62/589,968, filed on Nov. 22, 2017.

(51) Int. Cl.
*F16L 37/088* (2006.01)
*H01H 19/04* (2006.01)
*H01H 19/02* (2006.01)
*H01H 19/56* (2006.01)

(52) U.S. Cl.
CPC ......... *F16L 37/0885* (2019.08); *H01H 19/04* (2013.01); *F16L 2201/10* (2013.01); *H01H 19/025* (2013.01); *H01H 19/56* (2013.01)

(58) Field of Classification Search
CPC . F16L 37/0885; F16L 2201/10; F16L 37/088; H01H 19/04; H01H 19/025; H01H 19/56; H01H 19/585; H01H 19/02
See application file for complete search history.

(56) References Cited

U.S. PATENT DOCUMENTS

| | | |
|---|---|---|
| 4,632,437 A | 12/1986 | Robson et al. |
| 5,441,313 A | 8/1995 | Kalahasthy |
| 6,199,913 B1 | 3/2001 | Wang |
| 6,464,266 B1 | 10/2002 | O'Neill et al. |
| 6,927,651 B2 | 8/2005 | Ashton |
| 7,021,699 B2 | 4/2006 | Lindermeir et al. |
| 7,185,923 B2 | 3/2007 | McNeil et al. |

(Continued)

FOREIGN PATENT DOCUMENTS

| | | |
|---|---|---|
| FR | 2444331 | 7/1980 |
| JP | 2007-109649 | 4/2007 |

(Continued)

*Primary Examiner* — Lheiren Mae A Caroc
(74) *Attorney, Agent, or Firm* — Harter Secrest & Emery LLP; Michael Nicholas Vranjes

(57) ABSTRACT

A connection verifier, including a collar, a circuit board non-rotatably connected to the collar, the circuit board including at least one terminal, a switch rotatably connected to the collar and arranged to contact the at least one terminal, the switch including at least one finger extending in a first axial direction, and an indication device arranged to activate when the switch contacts the at least one terminal.

19 Claims, 9 Drawing Sheets

(56) References Cited

U.S. PATENT DOCUMENTS

| | | | |
|---|---|---|---|
| 7,690,694 B2 | 4/2010 | Poder | |
| 7,914,051 B2 | 3/2011 | Stoll et al. | |
| 8,029,024 B2 | 10/2011 | Guest | |
| 8,181,997 B2 | 5/2012 | Wang | |
| 8,328,244 B2 | 12/2012 | Johnson | |
| 8,366,154 B2 | 2/2013 | Wang | |
| 8,440,928 B2 * | 5/2013 | Hisamune | H01H 19/115 200/564 |
| 8,579,868 B2 | 11/2013 | Christiansen | |
| 8,844,974 B1 | 9/2014 | Crompton et al. | |
| 8,925,831 B2 | 1/2015 | Denzler | |
| 9,061,110 B2 | 6/2015 | Avery et al. | |
| 9,068,680 B1 | 6/2015 | Crompton et al. | |
| 9,115,837 B2 | 8/2015 | Barthel et al. | |
| 9,322,499 B2 | 4/2016 | Guest | |
| 9,447,905 B2 | 9/2016 | Nagaya | |
| 9,494,268 B2 | 11/2016 | Schutte et al. | |
| 9,506,592 B2 | 11/2016 | Turnau, III et al. | |
| 9,523,464 B2 | 12/2016 | Kashihara et al. | |
| 9,611,970 B2 | 4/2017 | Spears et al. | |
| 9,657,878 B2 | 5/2017 | Hartmann | |
| 9,671,049 B1 | 6/2017 | Crompton et al. | |
| 9,791,081 B2 | 10/2017 | Cosse et al. | |
| 2008/0191471 A1 | 8/2008 | Hartmann | |
| 2011/0309614 A1 | 12/2011 | Guest | |
| 2013/0092519 A1 | 4/2013 | Nishikawa et al. | |
| 2013/0296799 A1 | 11/2013 | Degtiar et al. | |
| 2015/0027869 A1 * | 1/2015 | Smith | H01H 13/85 200/341 |
| 2015/0145240 A1 | 5/2015 | Kujawski et al. | |
| 2015/0345684 A1 | 12/2015 | Kujawski, Jr. | |
| 2016/0319993 A1 | 11/2016 | Cosse et al. | |
| 2016/0379776 A1 * | 12/2016 | Oakley | H01H 13/84 200/5 A |
| 2017/0114935 A1 | 4/2017 | Kujawski, Jr. et al. | |
| 2017/0227153 A1 | 8/2017 | Nezu | |
| 2017/0254453 A1 | 9/2017 | Fremont et al. | |
| 2017/0307120 A1 | 10/2017 | Guest | |

FOREIGN PATENT DOCUMENTS

| | | |
|---|---|---|
| JP | 2013-089440 | 5/2013 |
| JP | 2013-120720 | 6/2013 |

* cited by examiner

CONNECTION VERIFIER

CROSS-REFERENCE TO RELATED APPLICATIONS

This application is the United States National Stage Application pursuant to 35 U.S.C. § 371 of International Patent Application No. PCT/US2018/056885, filed on Oct. 22, 2018, which application claims the benefit of U.S. Provisional Patent Application No. 62/589,968, filed on Nov. 22, 2017, which applications are hereby incorporated by reference in their entireties.

FIELD

The present disclosure relates to a connection verifier for a fluid connection, and, more particularly, to a connection verifier that indicates the status of a connection both on site and at a remote location, via wireless transmission.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip or snap ring carried on the fluid connector which is adapted to snap behind a raised shoulder of a tube end form when the tube end form is fully inserted into the fluid connector. If the tube end form is not fully inserted into the fluid connector, the fluid connection may fail causing fluids to leak out and other more serious consequences.

Thus, there has been a long-felt need for a connection verifier to ensure that a fluid connection is securely connected.

SUMMARY

According to aspects illustrated herein, there is provided a connection verifier, comprising a collar, a circuit board non-rotatably connected to the collar, the circuit board including at least one terminal, a switch rotatably connected to the collar and arranged to contact the at least one terminal, the switch including at least one finger extending in a first axial direction, and an indication device arranged to activate when the switch contacts the at least one terminal.

According to aspect illustrated herein, there is provided a connection verifier for a fluid connection, comprising an insert, including a radially outward facing surface, a radially inward facing surface, a first groove arranged in the radially inward facing surface, and a second groove arranged in the radially inward facing surface, a circuit board arranged in the first groove, the circuit board including at least one terminal, and an indication device, and a switch arranged in the second groove, the switch including at least one pin extending in a first axial direction and arranged to contact the at least one terminal, and at least one finger extending in a second axial direction, opposite the first axial direction.

According to aspects illustrated herein, there is provided a connection verifier, comprising, an insert, including a radially outward facing surface, and a radially inward facing surface, a circuit board non-rotatably connected to the radially inward facing surface, the circuit board including at least one terminal, and an indicator light, and a switch rotatably connected to the radially inward facing surface and arranged to contact the at least one terminal, the switch including at least one finger extending in a first axial direction.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly,"

"about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
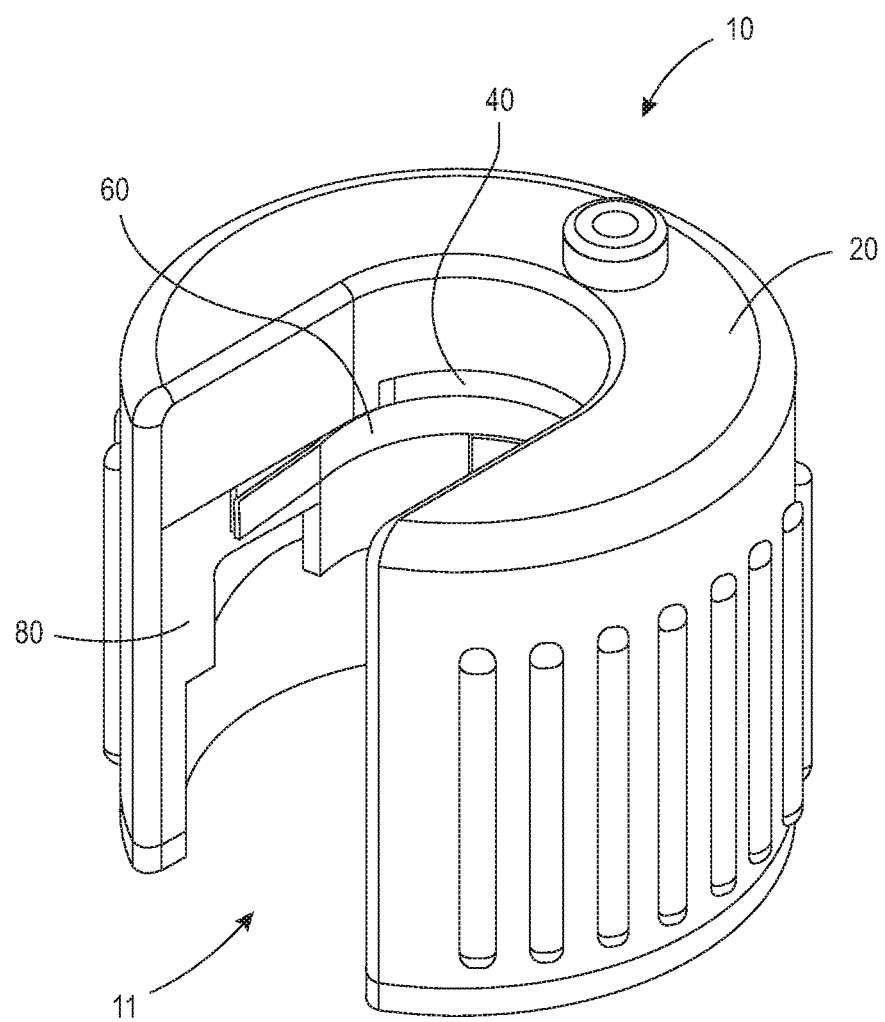
FIG. 1 is a perspective view of a connection verifier.
Figure 2:
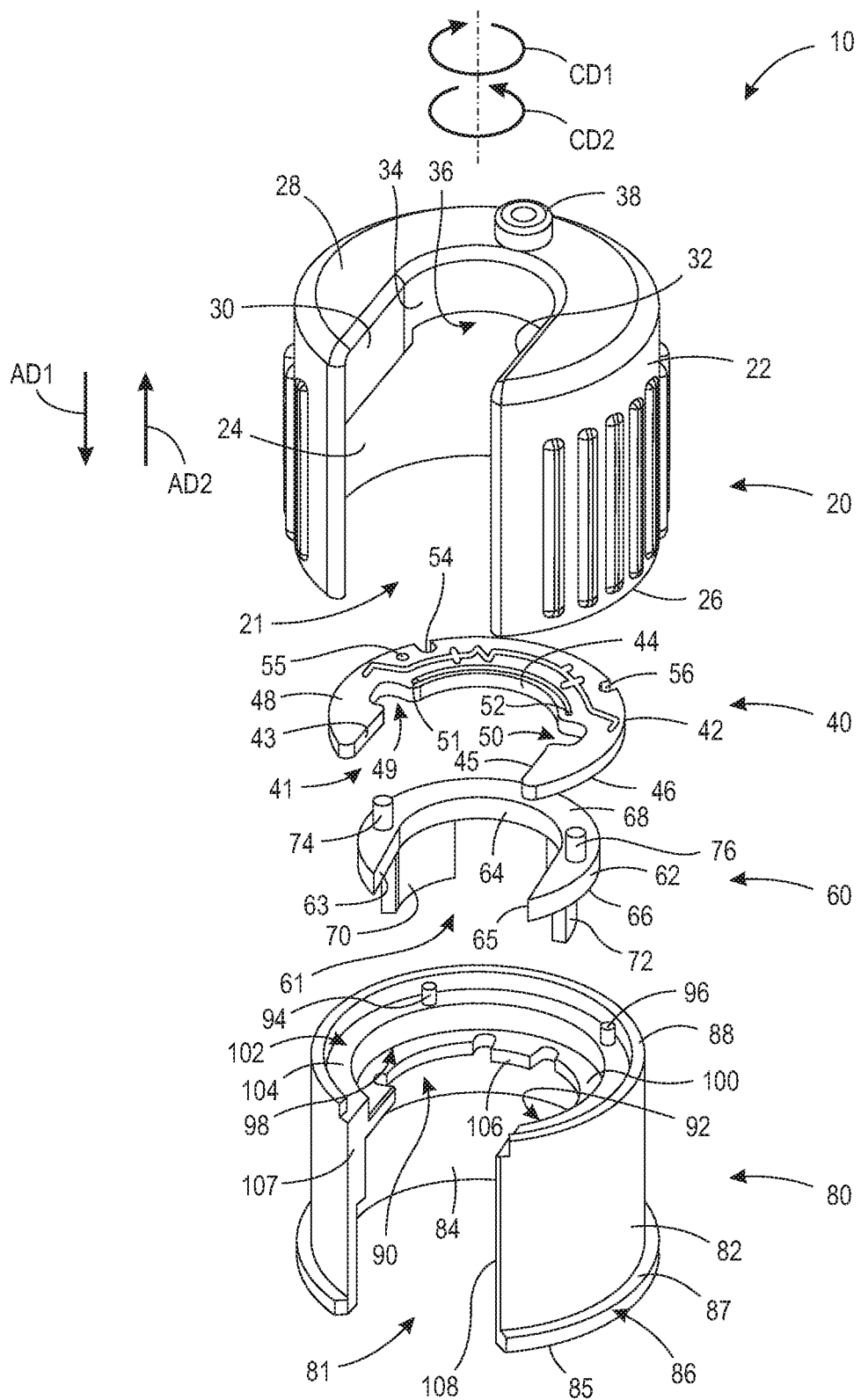
FIG. 2 is an exploded perspective view of the connection verifier shown in FIG. 1.

Adverting now to the figures, FIG. 1 is a perspective view of connection verifier 10. FIG. 2 is an exploded perspective view of connection verifier 10. Connection verifier 10 generally comprises collar 20, circuit board 40, switch 60, and insert 80.

Collar 20 is generally cylindrical and comprises radially outward facing surface 22, radially inward facing surface 24, bottom surface 26, and top surface 28. Collar 20 further comprises radially inward facing surface 34, which is arranged substantially concentric to radially inward facing surface 24, and surfaces 30 and 32 which are arranged substantially tangent to the curvature of radially inward facing surface 34. Surfaces 30 and 32 open radially inward facing surface 34 to form opening 21. In an example embodiment, radially outward facing surface 22 comprises a plurality of ribs for added grip. In an example embodiment, radially outward facing surface comprises another form of protrusion or friction material for added grip. Top surface 28 comprises conduit 38. Conduit 38 is arranged to connect circuit board 40 (and indicator light 55) with a power source through an electrical conductor, such as a wire. In an example embodiment, collar 20 is translucent such that indicator light 55 can be seen therethrough. In an example embodiment, collar 20 is transparent such that indicator light 55 can be seen therethrough. In an example embodiment, collar 20 is opaque and further comprises a window proximate indicator light 55, such that indicator light 55 can be seen therethrough. In an example embodiment, radially inward facing surface 34 further comprises cutout 36.

Circuit board 40 is generally disc-shaped and comprises radially outward facing surface 42, radially inward facing surface 44, bottom surface 46, and top surface 48. In an example embodiment, circuit board 40 is a printed circuit board (PCB). Circuit board 40 further comprises surfaces 43 and 45, which are arranged substantially tangent to the curvature of radially inward facing surface 44. Surfaces 43 and 45 open radially inward facing surface 44 to form opening 41. Top surface 48 comprises at least some of the circuitry, terminal 51, terminal 52, and an indicator device such as indicator light 55. Terminals 51 and 52 are arranged to be contacted by pins 74 and 76, respectively, to activate indicator light 55 and confirm a secure connection, as will be discussed in greater detail below. In an example embodiment, terminals 51 and 52 are sensors arranged to sense the proximate location of pins 74 and 76, respectively, such that physical contact between the pins and terminals need not occur. It should be appreciated that in the embodiment shown, circuit board 40 comprises two terminals; however, any suitable number of terminals may be used. In an example embodiment, indicator light 55 is not arranged on top surface 48, but rather is arranged on collar 20 or at another location external to circuit board 40. Indicator light 55 may be any suitable light known in the art, such as an incandescent lamp, compact fluorescent lamp, halogen lamp, metal halide lamp, light emitting diode, fluorescent tube, neon lamp, high intensity discharge lamp, and low pressure sodium lamp. Circuit board 40 further comprises slots 49 and 50 arranged proximate terminals 51 and 52, respectively, and extending radially outward from radially inward facing surface 44. Slot 49 provides circumferential boundaries for pin 74 and slot 50 provides circumferential boundaries for pin 76, as will be discussed in greater detail below. In an example embodiment, terminal 51 is arranged adjacent to or overlapping slot 49 such that pin 74 contacts terminal 51 when switch 60 rotates in circumferential direction CD1 relative to circuit board 40. In an example embodiment, terminal 52 is arranged adjacent to or overlapping slot 50 such that pin 76 contacts terminal 52 when switch 60 rotates in circumferential direction CD2 relative to circuit board 40. Circuit board 40 further comprises holes 54 and 56 arranged proximate radially outward facing surface 42. In an example embodiment, holes 54 and 56 extend radially inward from radially outward facing surface 42. Holes 54 and 56 are arranged to engage dowels 94 and 96, respectively, to non-rotatably connect circuit board 40 to insert 80, as will be discussed in greater detail below. It should be appreciated that in the embodiment shown, connection verifier 10 comprises two holes and two dowels to connect circuit board 40 with insert 80; however, any number of holes and dowels suitable to non-rotatably connect circuit board 40 with insert 80 may be used.

Circuit board 40 comprises any suitable circuit board (or circuit boards) that causes an indicator device, such as indicator light 55, to activate when one of pins 74 and 76 contacts its corresponding terminal, thereby indicating a secure connection. In an example embodiment, circuit board 40 is any suitable circuit board that causes an indicator device, such as indicator light 55, to activate when, in either order, one of pins 74 and 76 contacts its corresponding terminal, and subsequently the other of pins 74 and 76 contacts its corresponding terminal, thereby indicating a secure connection. In an example embodiment, circuit board 40 comprises a vibration device (e.g., vibration motor) such that when one of pins 74 and 76 contacts its corresponding terminal, the vibration device vibrates connection verifier 10 to indicate a secure connection. In an example embodiment, circuit board 40 comprises a vibration device such that when, in either order, one of pins 74 and 76 contacts its corresponding terminal, and subsequently the other of pins 74 and 76 contacts its corresponding terminal, the vibration device vibrates connection verifier 10 thereby indicating a secure connection. For example, the vibration device may be a haptic device which can take the form of a motor with an eccentric cam that vibrates or a piezo device that vibrates in response to an applied waveform. The piezo device can also produce an audible output. In an example embodiment, circuit board 40 comprises a sound device (e.g., a speaker and any other necessary sound equipment, such as an amplifier) such that when one of pins 74 and 76 contacts its corresponding terminal, the speaker outputs a noise to indicate a secure connection. In an example embodiment, circuit board 40 comprises a sound device (e.g., speaker and any other necessary sound equipment, such as an amplifier) such that when, in either order, one of pins 74 and 76 contacts its corresponding terminal, and subsequently the other of pins 74 and 76 contacts its corresponding terminal, the speaker outputs a noise to indicate a secure connection. Circuit board 40 may further comprise a microcontroller which contains one or more central processing units (CPUs) along with memory and programmable input/output peripherals. As is discussed in greater detail below, the microcontroller may be used to: activate indicator light 55 (or other indicator device) upon verification of a secure connection, initiate, using a transmission device, the transmission of a signal to a receiver at a remote location indicating a secure connection (or an unsecure connection), and activate a tool failure indicator.

Switch 60 comprises radially outward facing surface 62, radially inward facing surface 64, bottom surface 66, and top surface 68. Switch 60 further comprises surfaces 63 and 65, which are arranged substantially tangent to the curvature of radially inward facing surface 64. Surfaces 63 and 65 open radially inward facing surface 64 to form opening 61. Fingers 70 and 72 extend from bottom surface 66 in axial direction AD1. Fingers 70 and 72 engage slots 90 and 92 of insert 80, respectively, and are circumferentially displaceable therein. In an example embodiment, fingers 70 and 72 are curved protrusions arranged to engage snap ring 150, as will be discussed in greater detail below. It should be appreciated, however, that fingers 70 and 72 may have any other geometry, such as square-shape prism, rectangular-shaped prism, triangular-shaped prism, etc., suitable for engaging snap ring 150. Pins 74 and 76 extend from top surface 68 in axial direction AD2, opposite axial direction AD1. Pins 74 and 76 engage slots 49 and 50 of circuit board 40, respectively, and are circumferentially displaceable therein. In an example embodiment, pins 74 and 76 are cylindrical protrusions arranged to engage terminals 51 and 52, respectively, as will be discussed in greater detail below. It should be appreciated, however, that pins 74 and 76 may have any other geometry, such as square-shape prism, rectangular-shaped prism, triangular-shaped prism, etc., suitable for engaging terminals 51 and 52, respectively. When assembled, switch 60 is at least partially rotatable with respect to insert 80, circuit board 40, and collar 20.

Insert 80 is generally cylindrical and comprises radially outward facing surface 82, radially inward facing surface 84, flange 86, and top surface 88. Insert 80 and collar 20 are non-rotatably connected. Flange 86 includes bottom surface 85 and top surface 87. Insert 80 further comprises radially inward facing surface 106 forming groove 98, and slots 90 and 92, which extend radially outward from radially inward facing surface 106. Insert 80 further comprises surfaces 107 and 108, which are arranged substantially tangent to the curvature of radially inward facing surface 106. Surfaces 107 and 108 open radially inward facing surface 106 to form opening 81. Groove 98 includes surface 100. When connection verifier 10 is assembled, switch 60 is arranged in groove 98, bottom surface 66 is arranged proximate to, or abutting against, surface 100, and fingers 70 and 72 extend through slots 90 and 92, respectively, in axial direction AD1. There is circumferential clearance between fingers 70 and 72 and respective slots 90 and 92 such that switch 60 can displace in circumferential directions CD1 and CD2 relative to insert 80. Insert 80 further comprises groove 102 having surface 104. In an example embodiment, grooves 98 and 102 are concentrically arranged. Insert 80 further comprises dowels 94 and 96, which extend from surface 104 in axial direction AD2. Dowels 94 and 96 are arranged to engage holes 54 and 56, respectively, to non-rotatably connect circuit board 40 to insert 80. When connection verifier 10 is assembled, circuit board switch 60 is arranged in groove 102, bottom surface 46 is arranged proximate to, or abutting against, surface 104, holes 54 and 56 are engaged with dowels 94 and 96, respectively, and pins 74 and 76 extend through slots 49 and 50, respectively, in axial direction AD2. There is circumferential clearance between pins 74 and 76 and respective slots 49 and 50 such that switch 60 can displace in circumferential directions CD1 and CD2 relative to circuit board 40. In an example embodiment, when connection verifier 10 is assembled, top surface 48 is substantially flush or coplanar with top surface 88.

After switch 60 is arranged in groove 98 and circuit board 40 is arranged in groove 102, collar 20 is fitted over insert 80. When connection verifier 10 is assembled, radially inward facing surface 24 is arranged proximate to, or abutting against, radially outward facing surface 82, and bottom surface 26 is arranged proximate to, or abutting against top surface 87. Additionally, openings 21, 41, 61, and 81 are generally aligned to form opening 11. Collar 20, circuit board 40, and insert 80 are non-rotatably connected. Switch 60 is at least partially rotatable with respect to collar 20, circuit board 40, and insert 80. It should be appreciated that collar 20, circuit board 40, and insert 80 can be secured together using any suitable means, such as adhesives, bolts, screws, nails, rivets, dowels, or by force/interference fit.

Connection verifier 10 further comprises a transmission device that is electrically connected to circuit board 40 and optionally a memory device or a microcontroller. The transmission device is arranged to transmit a signal to a remote location indicating that a fluid connection is secure, or unsecure. In an example embodiment, the transmission device is arranged to send a signal via an electrical cable such as a wire or a fiber optic cable (i.e., a physical form of connection). The transmission device may use inter-integrated circuit ($I^2C$), controller area network (CAN), local interconnect network (LIN), or any suitable communication protocol known in the art. In an example embodiment, the transmission device is arranged to send a wireless communication to a receiver at a remote location which records the data sent (i.e., whether the fluid connection is securely connected, or not). The transmission device may transmit the data using any suitable method known in the art, for example, Bluetooth® communication, radio frequency, infrared, and Wi-Fi® communication. In an example embodiment, the transmission device may transmit the fluid connection identification number, the connection verifier identification number, the remaining life of the connection verifier, the vehicle identification number (VIN), the part number (e.g., engine, radiator, etc.) and serial number for that part, verification that a fluid connection is secure, and/or verification that a fluid connection is not secure. In an example embodiment, connection verifier can operate in conjunction with another device, such as a computer, to allow an electronic record to be kept of each inspection, and print a pass/fail label. In an example embodiment, the pass/fail label is connected to or kept together with the fluid connection.

Connection verifier 10 may further comprise a tool failure indicator, such as a light, a vibration device, or a sound device, to indicate that connection verifier 10 should be replaced. In this embodiment, connection verifier 10 could, for example, include a memory device or a microcontroller that is programmed with a predefined number, such that when connection verifier 10 is used a number of times equal to that predefined number, the tool failure indicator activates (i.e., the light turns on, the vibration device vibrates, the sound device creates a sound). The microcontroller may also tally the number of times connection verifier 10 is used, and using a preset remaining life calculation with a safety factor, continuously determine the remaining life of connection verifier 10.

Figure 3:
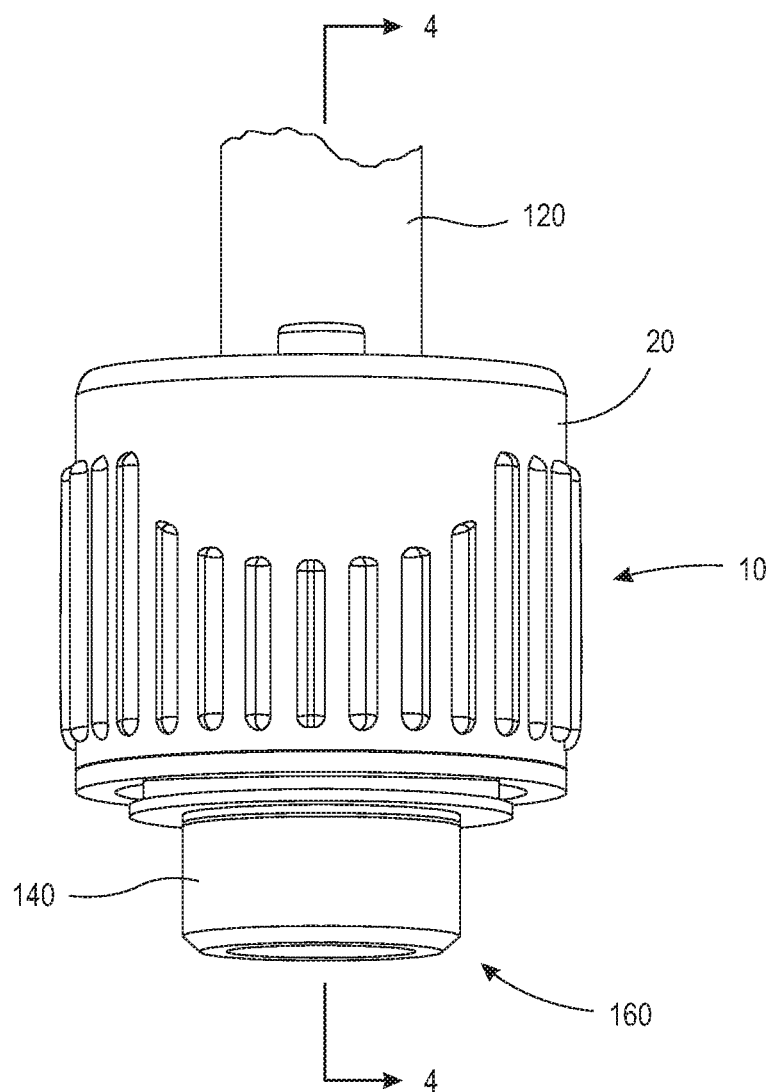
FIG. 3 is a perspective view of the connection verifier shown in FIG. 1 engaged with a fluid connection.
Figure 4:
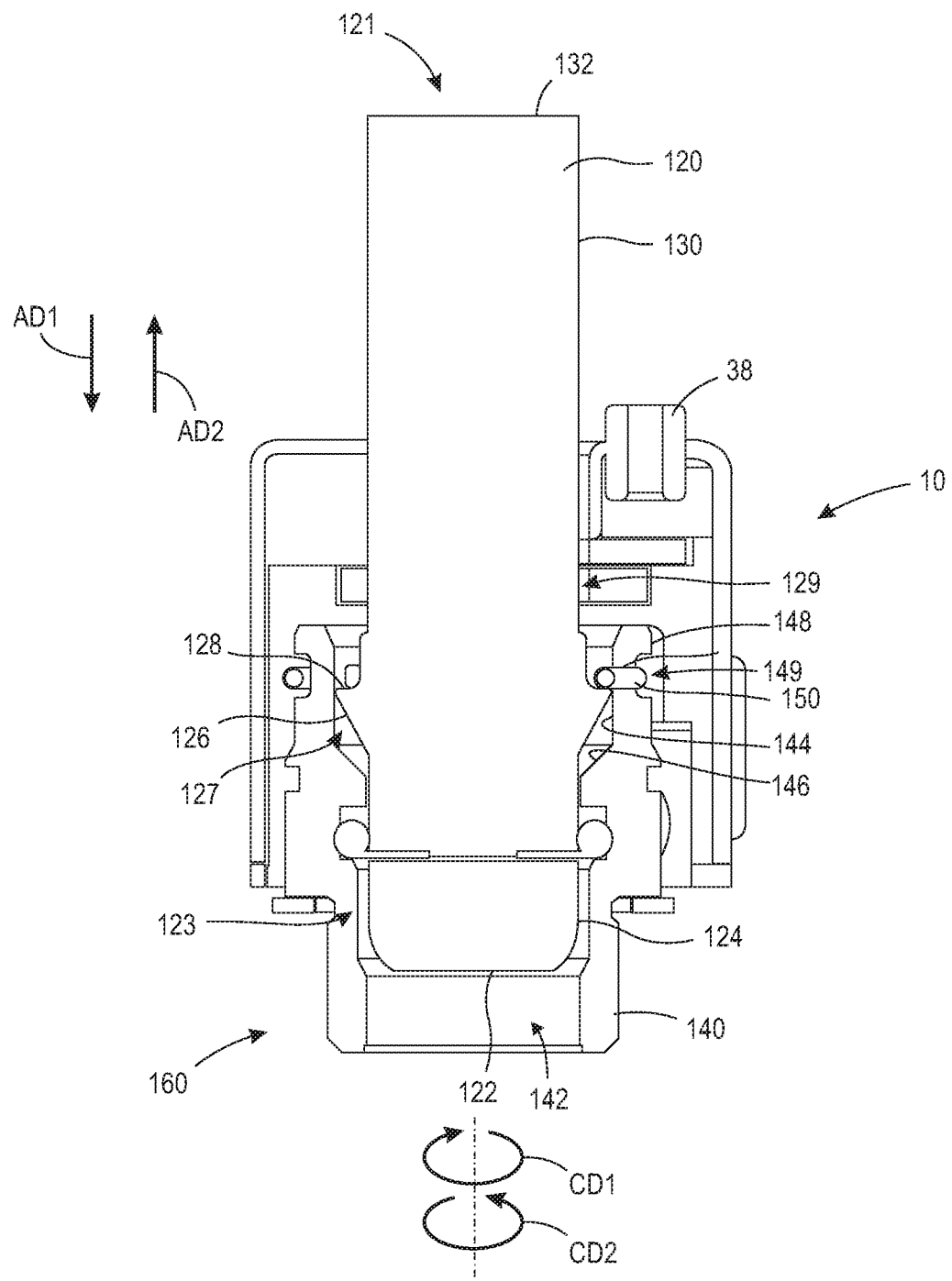
FIG. 4 is a cross-sectional view of the connection verifier and fluid connection taken generally along line 4-4 in FIG. 3.
Figure 5:
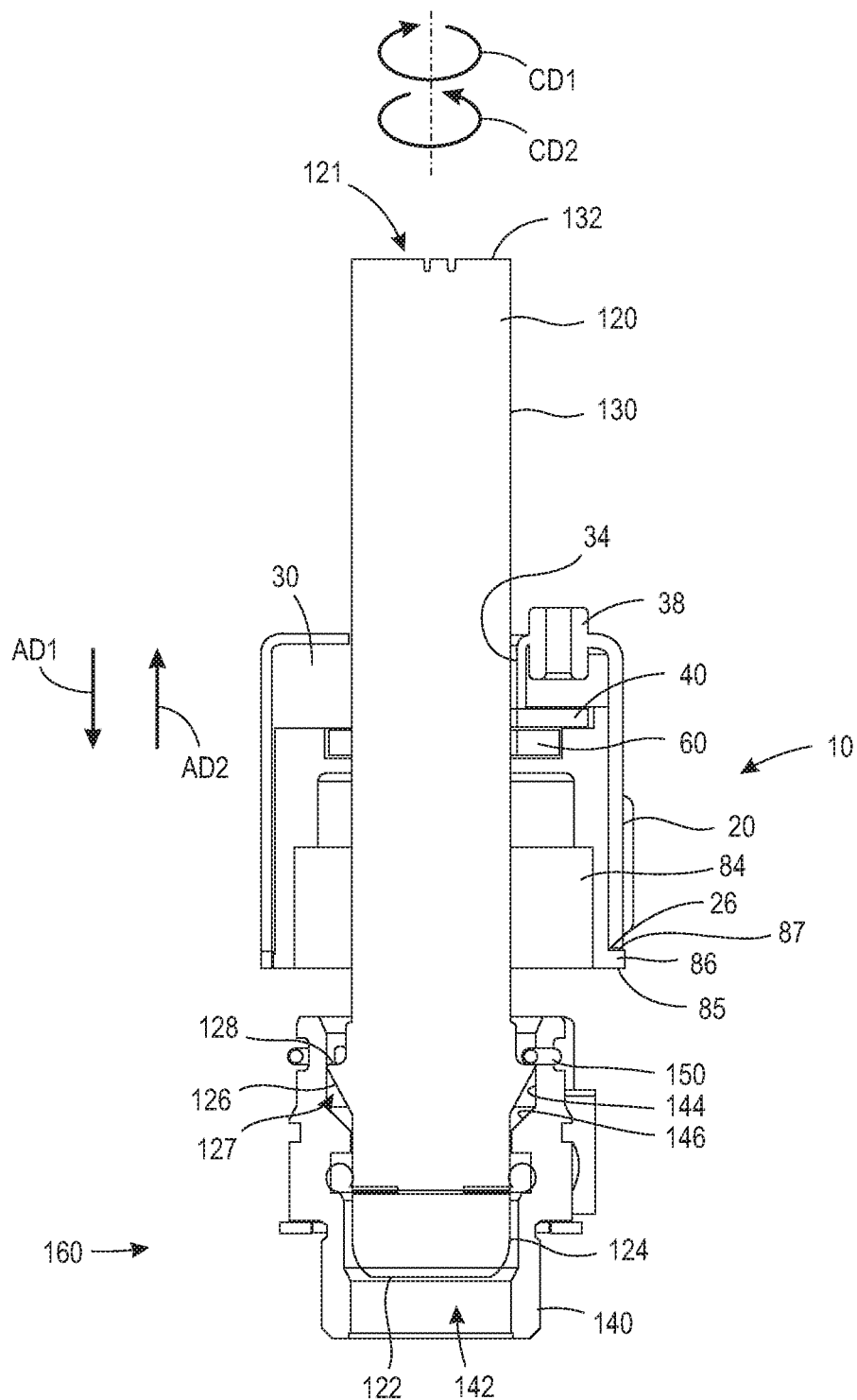
FIG. 5 is a cross-sectional view of the connection verifier and the fluid connection shown in FIG. 4, with the connection verifier disengaged.

FIG. 3 is a perspective view of connection verifier 10 engaged with fluid connection 160. FIG. 4 is a cross-sectional view of connection verifier 10 and fluid connection 160 taken generally along line 4-4 in FIG. 3. FIG. 5 is a cross-sectional view of connection verifier 10 and fluid connection 160 shown in FIG. 4, with connection verifier 10 disengaged. The following description should be read in light of FIGS. 3-5. Connection verifier 10 generally comprises tube end form 120, fluid connector 140, and snap ring 150.

Tube end form 120 comprises end 122, section 123, shoulder 127, section 129, end 132, and through-bore 121. Through-bore 121 extends through tube end form 120 from end 122 to end 132. Section 123 is arranged between end 122 and shoulder 127 and comprises radially outward facing surface 124. Radially outward facing surface 124 includes a substantially constant diameter. Shoulder 127 is arranged between section 123 and section 129 and comprises radially outward facing surface 126. Radially outward facing surface 126 is a linear conical shape and increases in diameter in axial direction AD2. Section 129 is arranged between shoulder 127 and end 132 and comprises radially outward facing surface 130. Radially outward facing surface 130 includes a substantially constant diameter. Shoulder 127 is connected to radially outward facing surface 130 via shoulder surface 128. Tube end form 120 is arranged to be inserted, specifically with end 122 first, into fluid connector 140. Tube end form 120 may utilize a straight ramp (i.e., constant linear ramp) or a curvilinear ramp, and is inserted into fluid connector 140 until snap ring 150 snaps over shoulder 127. It should be appreciated that tube end form 120 may be any traditional tube end form comprising a ramp, which extends radially outward and axially on the outer surface of the tube end form, to displace a snap ring or wire clip within the fluid connector to secure the tube end form within the fluid connector. In order to determine that fluid connection 160 is securely connected, connection verifier 10 essentially verifies that snap ring 150 has "snapped" over shoulder 127, as will be discussed in greater detail below.

Fluid connector 140 comprises through-bore 142, radially inward facing surface 144, radially inward facing surface 146, and radially outward facing surface 148. Radially outward facing surface 148 comprises groove 149. Snap ring 150 is arranged in groove 149. Snap ring 150 comprises protrusions 152A, 152B, and 152C (see FIG. 9). Protrusions 152A-C extend radially inward through holes in groove 149 to engage shoulder 127, specifically, shoulder surface 128.

To verify that fluid connection 160 is securely connected, connection verifier 10 is first arranged around tube end form 120 through opening 11 (opening 11 is shown in FIG. 1) as shown in FIG. 5 (i.e., disengaged). Connection verifier 10 is then slid down tube end form 120 in axial direction AD1 until in the engaged position shown in FIG. 4. In FIG. 4, connection verifier 10 has been slid down tube end form 120 in axial direction AD1 until fingers 70 and 72 contact snap ring 150 or shoulder surface 128 (not shown).

Figure 6:
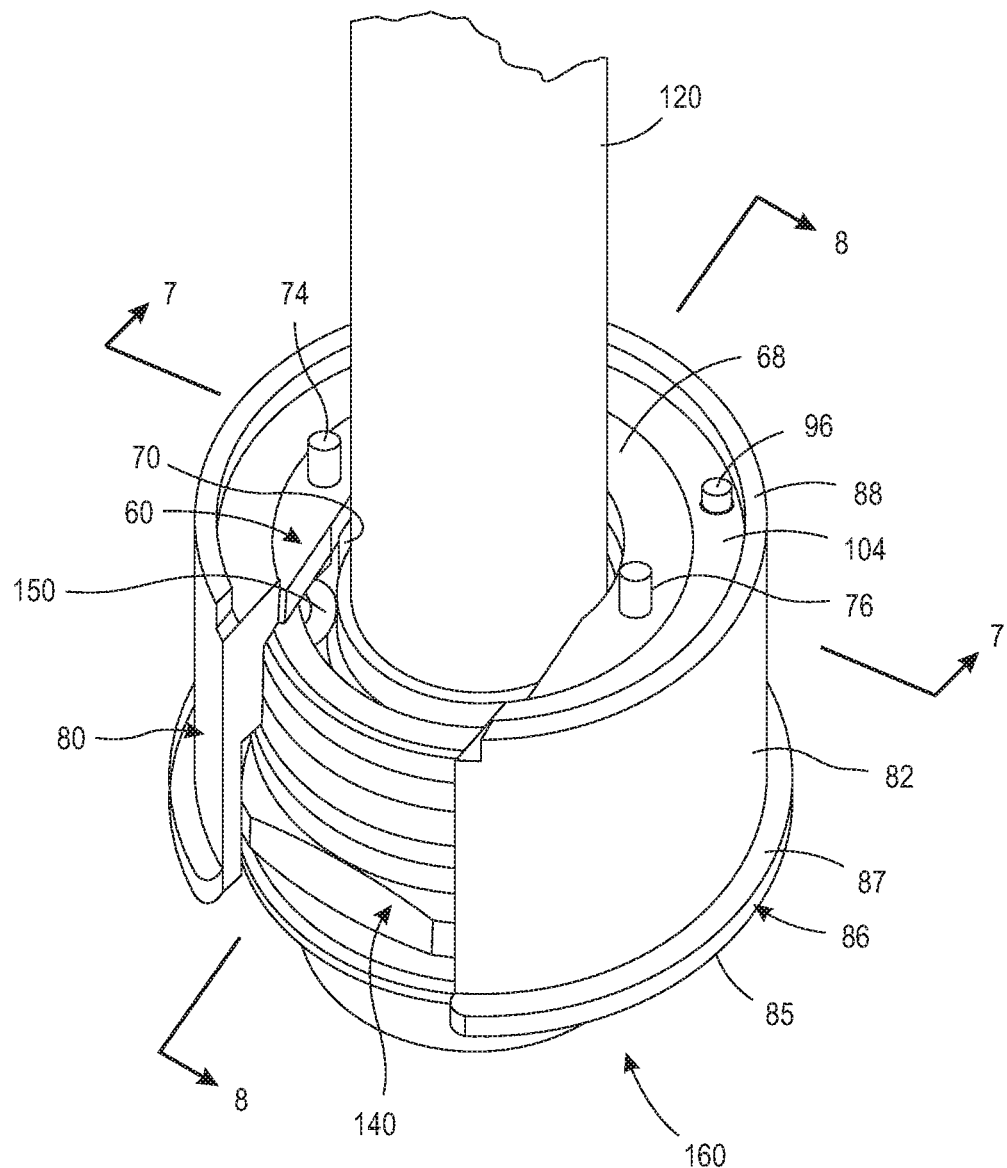
FIG. 6 is a perspective view of the connection verifier shown in FIG. 1 engaged with a fluid connection, with the collar and circuit board removed.

FIG. 6 is a perspective view of connection verifier 10 engaged with fluid connection 160. Collar 20 and circuit board 40 have been removed for viewing purposes. As can be seen, finger 70 extends down through insert 80 via slot 90, and is arranged to engage/contact the protrusions of snap ring 150.

Figure 7:
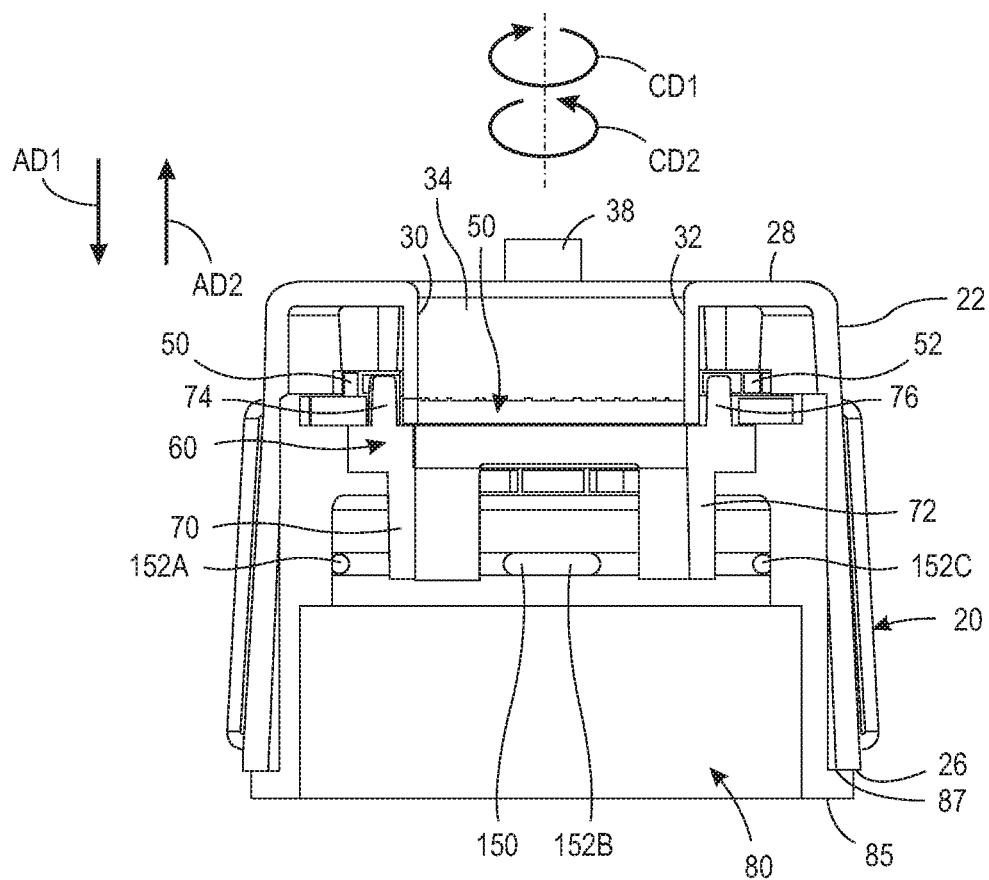
FIG. 7 is a cross-sectional view of the connection verifier taken generally along line 7-7 in FIG. 6, with the collar and circuit board assembled.

FIG. 7 is a cross-sectional view of connection verifier 10 taken generally along line 7-7 in FIG. 6. Tube end form 120 and fluid connector 140 have been removed for viewing purposes. Fingers 70 and 72 extend in direction AD1 between the protrusions of snap ring 150. Once fully engaged, connection verifier 10 is rotated in one of circumferential directions CD1 and CD2 such that one of fingers 70 and 72 contact a protrusion, which causes switch 60 to circumferentially displace and one of pins 74 and 76 to contact the respective terminal. For example, when connection verifier 10 is rotated in circumferential direction CD1, fingers 70 and/or 72 contact protrusions 152B and/or 152C, respectively, displacing switch 60 in circumferential direction CD2 relative to circuit board 40 and forcing pin 76 to engage terminal 52. When connection verifier 10 is rotated in circumferential direction CD2, fingers 70 and/or 72 contact protrusions 152A and/or 152B, respectively, displacing switch 60 in circumferential direction CD1 relative to circuit board 40 and forcing pin 74 to engage terminal 51. It should be appreciated, and as discussed above, in an example embodiment, switch 60 may only have one finger. It should be appreciated, that the inner diameters of insert 80 (i.e., radially inward facing surface 84) limit the amount in which snap clip 150 can expand when fingers 70 and 72 engage snap clip 150. This feature prevents fingers 170 and 172 from dislodging snap clip 150 from groove 149.

Figure 8:
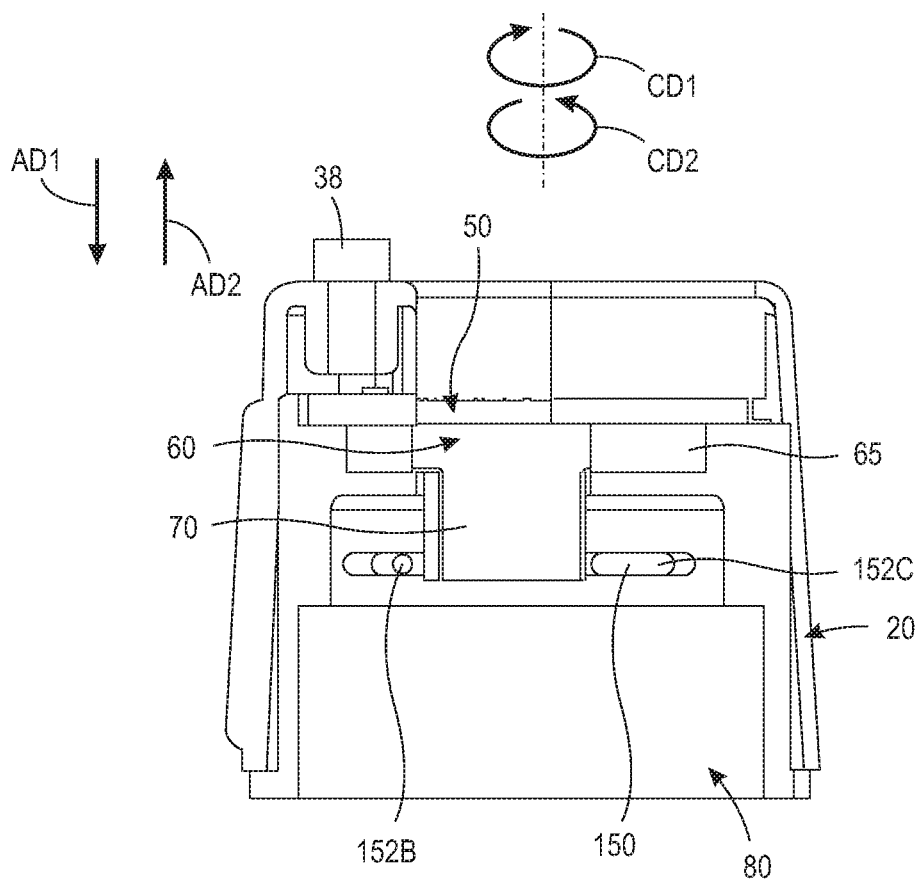
FIG. 8 is a cross-sectional view of the connection verifier taken generally along line 8-8 in FIG. 6, with the collar and circuit board assembled; and, FIG. 9 is a bottom elevational view of the connection verifier engaged with the snap ring.

FIG. 8 is a cross-sectional view of connection verifier 10 taken generally along line 8-8 in FIG. 6. Tube end form 120 and fluid connector 140 have been removed for viewing purposes. As shown, finger 70 extends down between protrusion 152B and protrusion 152C in axial direction AD1.

Figure 9:
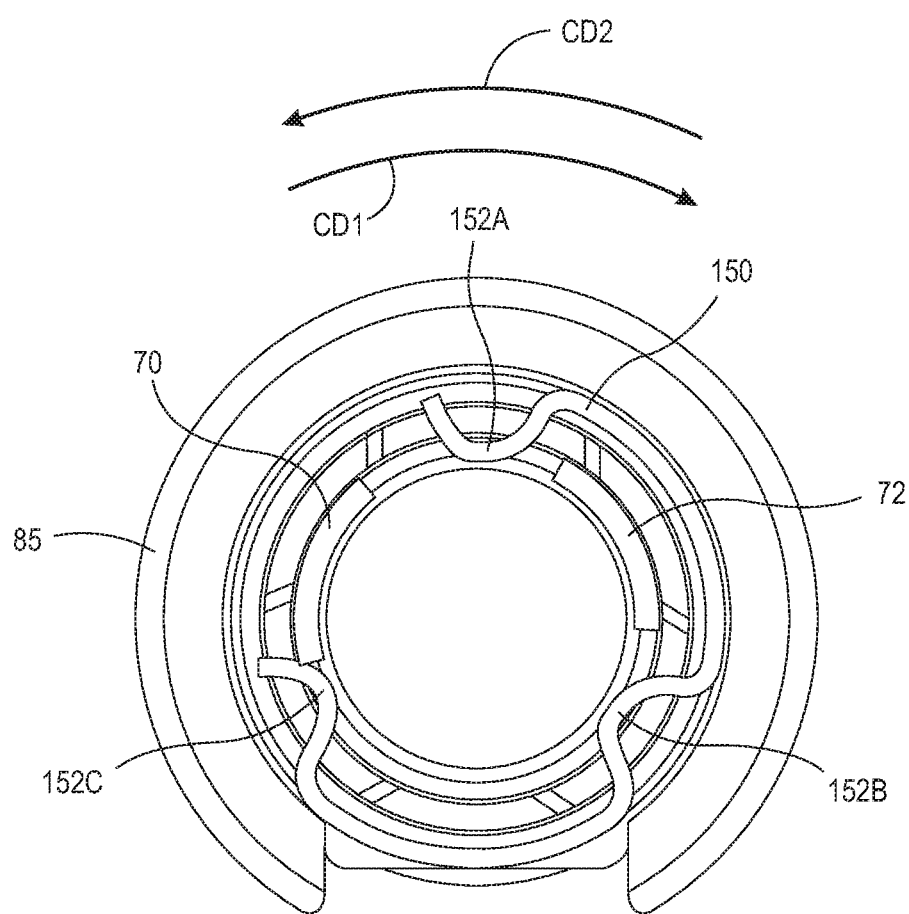

FIG. 9 is a bottom elevational view of connection verifier 10 engaged with snap ring 150. As shown in FIG. 9, finger 70 extends down between protrusions 152A and 152C and finger 72 extends down between protrusions 152A and 152B. In an example embodiment, once fingers 70 and 72 are engaged with snap ring 150 (i.e., extend through protrusions), connection verifier 10 is rotated in direction CD1 until finger 70 contacts protrusion 152C thereby displacing switch 60 in circumferential direction CD2 relative to circuit board 40 and forcing pin 76 to engage terminal 52. This is verification of a first protrusion being properly assembled over shoulder 27 (first verification). Subsequently, connection verifier 10 is rotated in direction CD2 until finger 72 contacts protrusion 152B thereby displacing switch 60 in circumferential direction CD1 relative to circuit board 40 and forcing pin 74 to engage terminal 51. This is verification of a second protrusion being properly assembled over shoulder 27 (second verification).

In an example embodiment, once fingers 70 and 72 are engaged with snap ring 150 (i.e., extend through protrusions), connection verifier 10 is rotated in direction CD2 until finger 72 contacts protrusion 152B thereby displacing switch 60 in circumferential direction CD1 relative to circuit board 40 and forcing pin 74 to engage terminal 51. This is verification of a first protrusion being properly assembled over shoulder 27 (first verification). Subsequently, connection verifier 10 is rotated in direction CD1 until finger 70 contacts protrusion 152C thereby displacing switch 60 in circumferential direction CD2 relative to circuit board 40 and forcing pin 76 to engage terminal 52. This is verification of a second protrusion being properly assembled over shoulder 27 (second verification).

In an example embodiment, indicator light 55 may activate upon first verification and then again on second verification (the light turns on once each terminal is contacted). In an example embodiment, and as previously discussed, connection verifier 10 may include a microcontroller or other computer device (e.g., located on circuit board 40) that may be programmed such that indicator light 55 activates only if both terminals are contacted within a set period of time. For example, the microcontroller may include a program that requires: 1) one of terminal 51 and terminal 52 is contacted by a respective pin; and, 2) the other of terminal 51 and terminal 52 is contacted by a respective pin within two seconds; and/or, 3) the program resets. According to this program, if terminals 51 and 52 are contacted within two seconds of each other, indicator light 55 activates, the transmitter device sends a signal to a remote location indicating that the fluid connector is securely connected, and the program resets for use on another fluid connector. If terminals 51 and 52 are not contacted within two seconds of each other, indicator light 55 does not activate, a transmitter device does not send a signal to the remote location, and the program resets. Various programs may be used, as is known in the art, to properly program connection verifier 10 to indicate both visually and at a remote location (e.g., a database or list), that the fluid connection is securely connected.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Connection verifier
11 Opening
20 Collar
21 Opening
22 Radially outward facing surface
24 Radially inward facing surface
26 Bottom surface
28 Top surface
30 Surface
32 Surface
34 Radially inward facing surface
36 Cutout
38 Conduit
40 Circuit board
41 Opening
42 Radially outward facing surface
43 Surface
44 Radially inward facing surface
45 Surface
46 Bottom surface
48 Top surface
49 Slot
50 Slot
51 Terminal
52 Terminal
55 Indicator light
54 Hole
56 Hole
60 Switch
61 Opening
62 Radially outward facing surface
63 Surface
64 Radially inward facing surface
65 Surface
66 Bottom surface
68 Top surface
70 Finger
72 Finger
74 Pin
76 Pin
80 Insert
82 Radially outward facing surface
84 Radially inward facing surface
85 Bottom surface
86 Flange
87 Top surface
88 Top surface
90 Slot
92 Slot
94 Dowel
96 Dowel
98 Groove
100 Surface
102 Groove
104 Surface
106 Radially inward facing surface
107 Surface
108 Surface
120 Tube end form
121 Through-bore
122 End
123 Section
124 Radially outward facing surface
126 Radially outward facing surface
127 Shoulder
128 Shoulder surface
129 Section
130 Radially outward facing surface
132 End
140 Fluid connector
142 Through-bore
144 Radially inward facing surface
146 Radially inward facing surface
148 Radially outward facing surface
149 Groove
150 Snap ring
152A Protrusion
152B Protrusion
152C Protrusion
160 Fluid connection

What is claimed is:

1. A connection verifier for a fluid connection, comprising:
    a collar including an opening arranged to engage the fluid connection;
    a circuit board non-rotatably connected to the collar, the circuit board including at least one terminal;
    a switch rotatably connected to the collar and arranged to contact the at least one terminal, the switch including at least one finger extending in a first axial direction into the opening and arranged to engage a snap ring of the fluid connection; and,
    an indication device arranged to activate when the switch contacts the at least one terminal.

2. The connection verifier as recited in claim 1, wherein the collar comprises an insert arranged substantially concentric therein, the insert including a first groove and a second groove.

3. The connection verifier as recited in claim 2, wherein the circuit board is arranged in the first groove and the switch is arranged in the second groove.

4. The connection verifier as recited in claim 1, wherein the switch further comprises at least one pin extending in a second axial direction, opposite the first axial direction, arranged to contact the at least one terminal.

5. The connection verifier as recited in claim 1, further comprising a transmission device electrically connected to the circuit board.

6. The connection verifier as recited in claim 5, wherein the transmission device is operatively arranged to transmit a signal to a remote receiver indicating a connection status of the fluid connection.

7. The connection verifier as recited in claim 1, further comprising a microcontroller electrically connected to the circuit board.

8. The connection verifier as recited in claim 1, wherein the indication device is a light.

9. The connection verifier as recited in claim 1, wherein the indication device is a vibration device.

10. The connection verifier as recited in claim 1, wherein the indication device is a sound device.

11. The connection verifier as recited in claim 1, wherein the collar includes a conduit through which the circuit board is connected to a power source.

12. A connection verifier for a fluid connection, comprising:
    an insert, including:
        a radially outward facing surface;
        a radially inward facing surface;
        a first groove arranged in the radially inward facing surface; and,
        a second groove arranged in the radially inward facing surface;
    a circuit board arranged in the first groove, the circuit board including:
        at least one terminal; and,
        an indication device; and,
    a switch arranged in the second groove, the switch including:
        at least one pin extending in a first axial direction, extending through the circuit board, and arranged to contact the at least one terminal; and,
        at least one finger extending in a second axial direction, opposite the first axial direction.

13. The connection verifier as recited in claim 12, wherein the insert further comprises a collar non-rotatably connected to the radially outward facing surface.

14. The connection verifier as recited in claim 12, further comprising a transmission device electrically connected to the circuit board.

15. The connection verifier as recited in claim 14, wherein the transmission device is operatively arranged to transmit a signal to a remote receiver indicating a connection status of the fluid connection.

16. The connection verifier as recited in claim 12, further comprising a microcontroller electrically connected to the circuit board.

17. The connection verifier as recited in claim 12, wherein the indication device is a light.

18. The connection verifier as recited in claim 12, wherein the indication device is a vibration device.

19. The connection verifier as recited in claim 12, wherein:
    the circuit board is non-rotatably connected to the insert; and,
    the switch is rotatably connected to the insert.

* * * * *